United States Patent
Mangum et al.

(10) Patent No.: US 6,290,381 B1
(45) Date of Patent: Sep. 18, 2001

(54) OPTICAL FIBER LIGHT FIXTURE

(76) Inventors: Scott Mangum, 14731 Morgan Trail, Novelty, OH (US) 44072; Susan L. Ljungberg, 373 Cottonwood Dr., Williamsville, NY (US) 14221

(*) Notice: Subject to any disclaimer, the term of this patent is extended or adjusted under 35 U.S.C. 154(b) by 0 days.

(21) Appl. No.: 09/067,224

(22) Filed: Apr. 28, 1998

Related U.S. Application Data

(60) Provisional application No. 60/045,260, filed on Apr. 28, 1997.

(51) Int. Cl.[7] ............................................. F21V 8/00
(52) U.S. Cl. ..................... 362/554; 362/558; 362/576; 362/375; 362/365
(58) Field of Search ................................ 362/554, 558, 362/576, 147, 364, 365, 374, 375, 362

(56) References Cited

U.S. PATENT DOCUMENTS

| | | | |
|---|---|---|---|
| 5,325,271 | * | 6/1994 | Hutchisson ........................ 362/558 |
| 5,690,408 | * | 11/1997 | De La Pena et al. ............... 362/558 |
| 6,082,884 | * | 7/2000 | McDonalds et al. ............... 362/551 |

\* cited by examiner

*Primary Examiner*—Thomas M. Sember
(74) *Attorney, Agent, or Firm*—Stout, Uxa, Buyan & Mullins, LLP; Donald E. Stout

(57) ABSTRACT

A unique fiber optic light fixture is provided which has a unique right angle design for ease of installation. The light fixture includes a molded housing which is lightweight, durable and compact. The light fixture is particularly attractive for lighting applications where space is at a premium and weight is an important consideration, such as the typical suspended ceiling in an office environment. The inventive lighting fixture provides "safe" and "cold" light as opposed to conventional heat generating lamps and ballasts, and may be mounted into walls, floors, ceilings, furniture, and any other space where exterior or interior lighting would normally be placed. The fixture includes a housing, wherein the interior has been coated with a metallic finish for reflectivity, a bezel for holding a variety of lenses and other optical accessories, retaining springs, and a brass nut bracket.

18 Claims, 3 Drawing Sheets

OPTICAL FIBER LIGHT FIXTURE

RELATED APPLICATIONS

This application claims the benefit under 35 U.S.C. 119(e) of the filing date of U.S. Provisional Patent Application Ser. No. 60/045,260, filed on Apr. 28, 1997.

FIELD OF THE INVENTION

The present invention relates generally to optical fiber illumination systems, and more particularly to optical fiber light fixtures for such systems.

BACKGROUND OF THE INVENTION

Large diameter fiber optics, often referred to as "flexible light guides", are well known in the art, and typically comprise a single, solid core fiber which is surrounded by a cladding layer and a sheath of shielding layer. The core is a portion of a light guide which transmits light, and typically has a diameter of about 2 to 12 mm. It is formed of a very soft, semi-liquid plastic material, such as OPTIFLEX®, which is manufactured by Rohm & Haas Corporation, of Philadelphia, Pa. The cladding layer typically comprises polytetrafluoroethylene (PTFE or TEFLON®), or the like, while the outer sheath is fabricated of a material such as polyvinyochloride (PVC). Unlike small diameter light guides, which are typically used to transmit information in relatively complex communications systems, these large diameter "light guides" are typically employed in a variety of illumination systems where direct lighting is difficult to maintain, dangerous, or subject to vandalism. Examples include architectural lighting, display cases, pools, and spas (to eliminate electrical connections near water), hazardous material zones (to eliminate the need for sealed lighting), or jail cells. Large diameter light guides are particularly advantageous in that only a single centralized illumination system must be maintained, rather than a plurality of individual lights.

There are problems, however, in implementing state of the art light guide illumination systems because of the difficulty of illuminating a plurality of light guides from a single illumination source. Many of these problems are resolved by innovative systems developed by Remote Source Lighting International, of Durham, N.C., as disclosed in related U.S. Pat. No. 5,559,911, herein expressly incorporated by reference. However, another problem is the availability of suitable optical fiber fixtures for creating attractive and practical installations in finished spaces, such as conference rooms, offices, showrooms, and the like.

It would be advantageous, therefore, to have an output optical fiber fixture which was inexpensive to manufacture, capable of delivering safe, cool light, easy to install in ceilings, walls, or the like, adaptable to the installation of various optical accessories, sealable for use in "clean" or hazardous environments, and capable of accommodating optical fibers of various diameters.

SUMMARY OF THE INVENTION

The present invention provides a unique fiber optic light fixture with a unique right angle design for ease of installation. The light fixture includes a molded housing which is lightweight, durable and compact. The light fixture is particularly attractive for lighting applications where space is at a premium and weight is an important consideration, such as the typical suspended ceiling in an office environment. The inventive lighting fixture provides "safe" and "cold" light as opposed to conventional heat generating lamps and ballasts, and may be mounted into walls, floors, ceilings, furniture, and any other space where exterior or interior lighting would normally be placed.

The inventive lighting fixture comprises four basis components. These include a housing, wherein the interior has been coated with a metallic finish for reflectivity, a bezel for holding a variety of lenses and other optical accessories, retaining springs, and a brass nut bracket.

More particularly, there is provided a fiber optic illumination system which comprises a light source, an optical fiber for transmitting light from the light source, and a light fixture which is optically connected to the optical fiber. Preferably, a plurality of optical fibers and a corresponding number of light fixtures are provided. The light fixture includes a housing, an inlet port disposed in a sidewall of the housing, an internal reflector for changing the direction of light entering the housing through the inlet port, and an outlet port disposed on one end of the housing for delivering light to the desired region to be illuminated.

Preferably the housing comprises two engageable or mating portions and retaining hardware, preferably a retaining spring, for mounting the housing to suitable supporting structure, such as a ceiling or wall.

In another aspect of the invention, a light fixture is provided which comprises a housing having a sidewall, an inlet port disposed on the housing sidewall, an internal reflector for changing the direction of light entering the housing through the inlet port, and an outlet port disposed on one end of the housing for delivering light to the desired region to be illuminated.

In yet another aspect of the invention, there is provided a method for assembling a light fixture for a fiber optic illumination system. The light fixture comprises two mateable housing portions, wherein the first housing portion comprises an outlet port and the second housing portion comprises an inlet port. The method preferably comprises the steps of inserting an optical accessory comprising one of a diffuser, a lens, a color filter, a shutter, or decorative trim into the first housing portion and mating the first and second housing portions. A particularly advantageous feature of the invention is that the housing portions may later be disassembled so that the optical accessory may be removed. Then, a different optical accessory may be installed and the housing portions reassembled.

The invention, together with additional features and advantages thereof, may best be understood by reference to the following description taken in conjunction with the accompanying illustrative drawing.

DESCRIPTION OF THE PREFERRED EMBODIMENT

Figure 1:
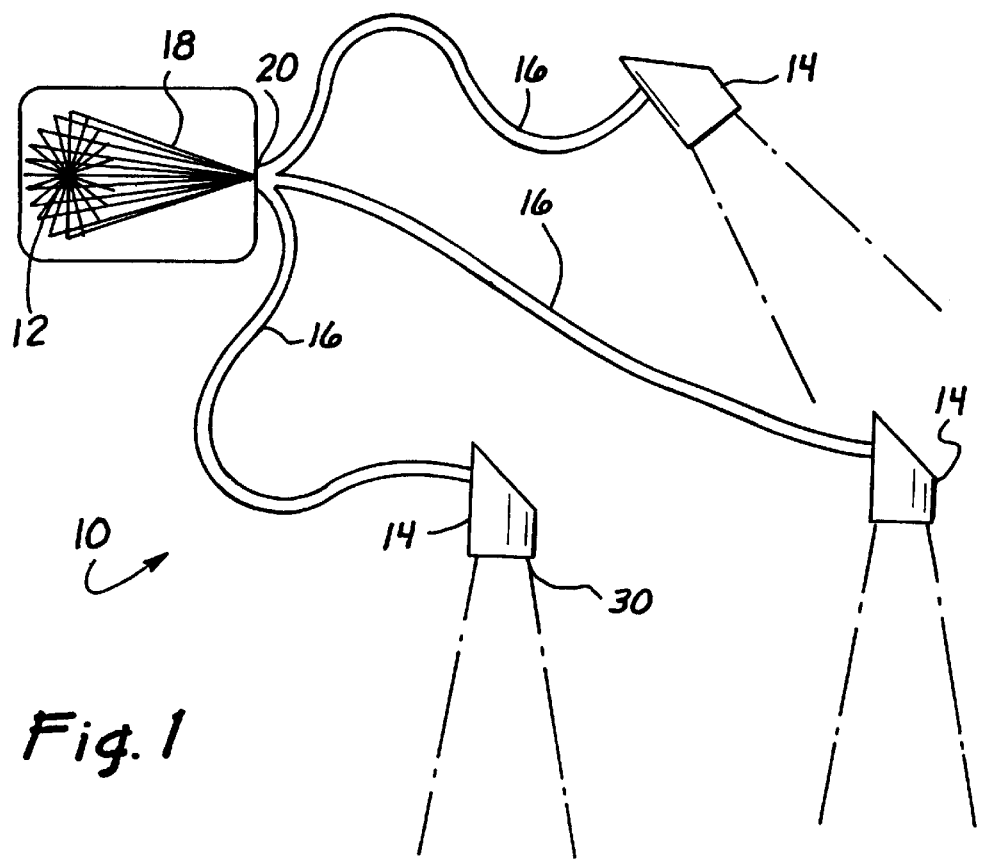
FIG. 1 is schematic view of an optical fiber illumination system employing optical fiber light fixtures constructed in accordance with the principles of the present invention.

Referring now more particularly to FIG. 1, there is shown therein an optical fiber illumination system 10 which is adapted for installation in any environment wherein it is desired to illuminate the environment using a remote light source 12. The system 10 comprises a plurality of optical fiber light fixtures 14, each of which distributes light transmitted from the light source 12 to a different predetermined area. The light is transmitted from the light source 12 to the light fixtures 14 by means of optical fibers 16, as shown. As illustrated in FIG. 1, a reflector 18 may be utilized to collect and distribute the light emitted from the light source 12 to the input end 20 of the optical fibers 16, in a manner known in the art and described, for example, in U.S. Pat. No. 5,559,911, herein expressly incorporated by reference.

Such illumination systems are particularly useful, for example, in underwater or hazardous environments, where it is difficult or dangerous to access the light fixtures for maintenance, as well as in settings where vandalism may be a problem or where a distinctive architectural impression is to be made. Increasingly, as well, illumination systems employing a remote light source are being installed because of cost advantages. These systems also have the advantage of providing a relatively cool, light emitting fixture because the light source is mounted in a location remote from the relatively hot illumination source.

Figure 2:
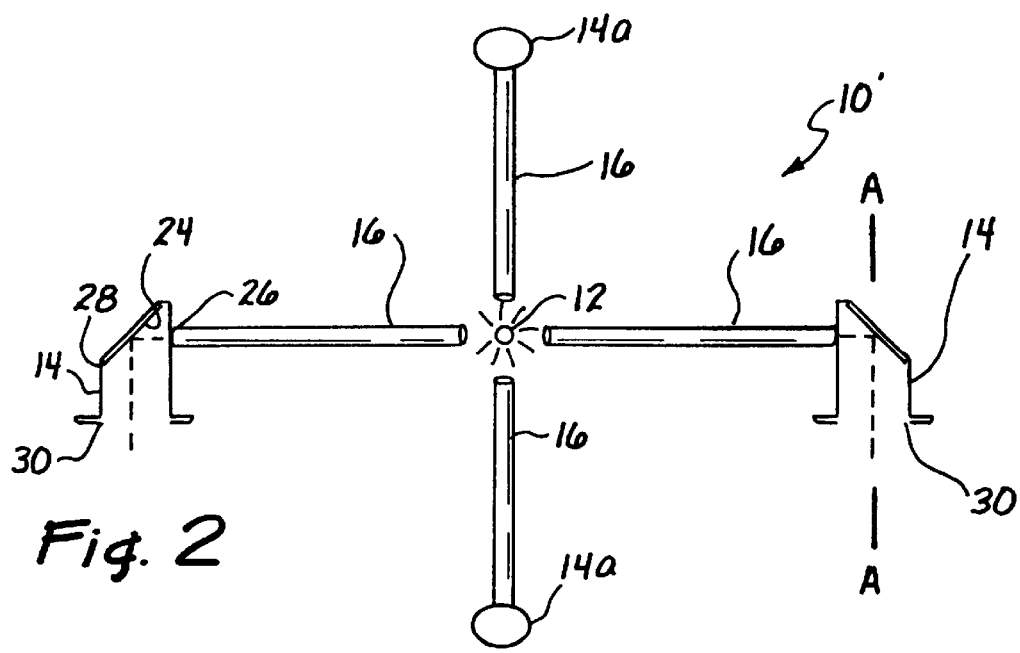
FIG. 2 is a schematic view of a modified optical fiber illumination illustrating certain details of the inventive optical fiber light fixtures.

FIG. 2 illustrated an optical fiber illumination system 10' similar to that illustrated in FIG. 1, wherein the light source 12 is centrally disposed, with a plurality of optical fiber light fixtures disposed thereabout, each optically connected to the light source 12 by means of an optical fiber 16. It is intended that the systems illustrated in FIGS. 1 and 2 are merely illustrative of the varied system arrangements in which the inventive optical fiber light fixtures 14 may be employed.

Figure 3:
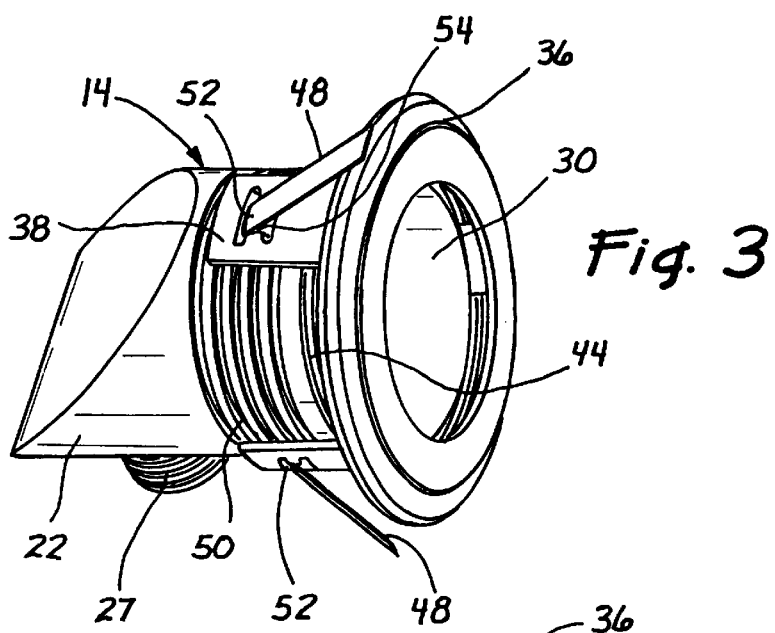
FIG. 3 is a perspective view in isolation of an optical fiber light fixture constructed in accordance with the principles of the present invention.
Figure 4:
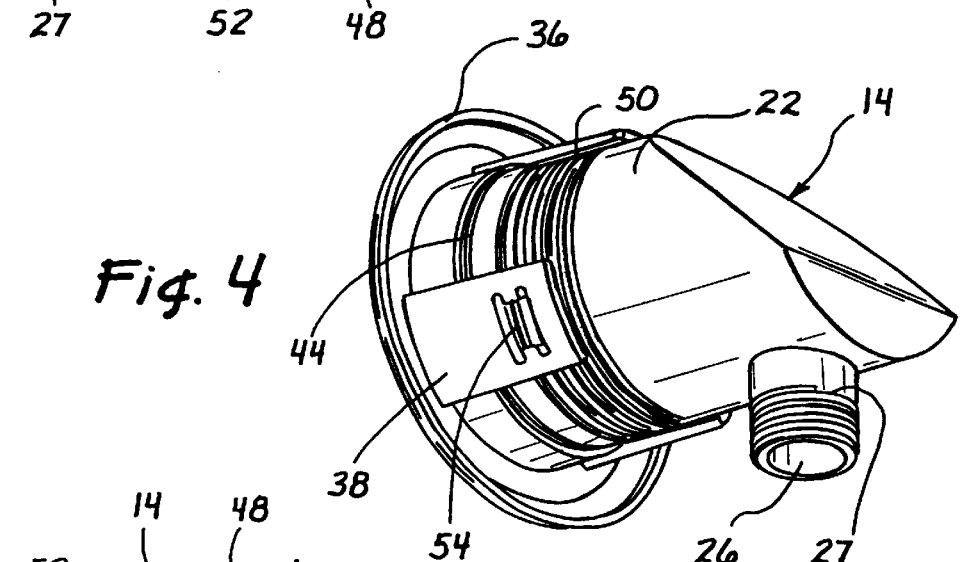
FIG. 4 is a perspective view similar to FIG. 3, illustrating an opposing side of the inventive optical fiber light fixture.
Figure 5:
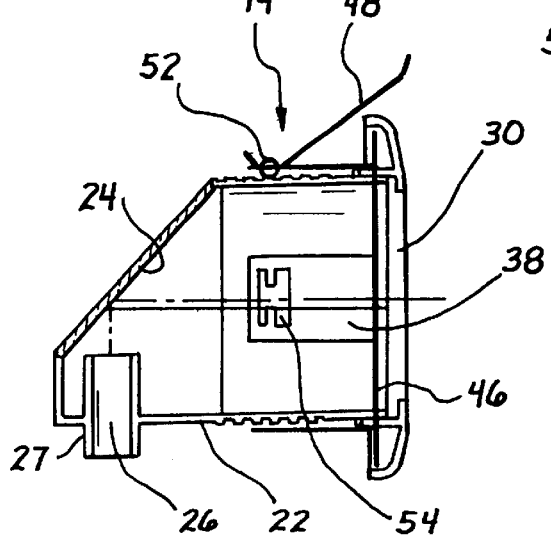
FIG. 5 is a cross-sectional view from the side of the optical fiber light fixture shown in FIGS. 3 and 4.

Now with reference to FIGS. 1–5, the inventive optical fiber light fixtures 14 will be more particularly described. Preferably, each optical fiber light fixture 14 comprises a housing 22 (FIGS. 3 and 4). Advantageously, because the light source 12 is remote from the housing 22, it is in a relatively cool environment, and may therefore be fabricated of inexpensive injection molded plastic materials. The housing 22 includes an angled interior surface 24 (FIGS. 2 and 5) adjacent to an inlet aperture 26 on the housing 22 for the optical fiber 16. An advantageous feature of the invention is the placement of the inlet aperture 26 on the side of the housing 22, which allows reduced cavity space when installed, in the wall, ceiling, and plenum. The inlet aperture 26 preferably includes a threaded fitting 27 for attachment to the exit end of the optical fiber 16. A top view of the housing 22 is shown as element 14a in FIG. 2.

The angled interior surface 24 preferably comprises a coated metalized surface, a polished metal element, or a conventional glass mirror, in order that it may function as a reflector, or a separate reflector 28 may be installed thereon, as illustrated in FIG. 2. The angle of the interior reflecting surface 24 and/or the reflector 28 is preferably between about 30 and 60 degrees from the vertical or longitudinal axis A—A (FIG. 2) of the light emitting housing 22 (the axis is typically vertical because the light fixture is preferably mounted in a vertical orientation), and most preferably about 45 degrees from the vertical axis A—A, in order to alter the direction of the light emitted from the exit end of the optical fiber 16 by about 90 degrees so that the light is transmitted through an exit aperture 30 in the light fixture 14.

Figure 6:
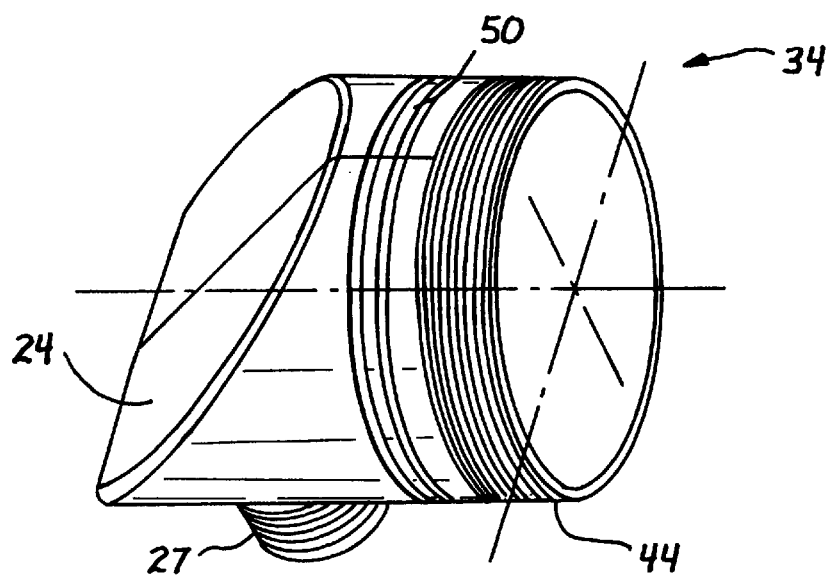
FIG. 6 is a perspective view of one piece of the two-piece housing comprising the inventive optical fiber light fixture.
Figure 7:
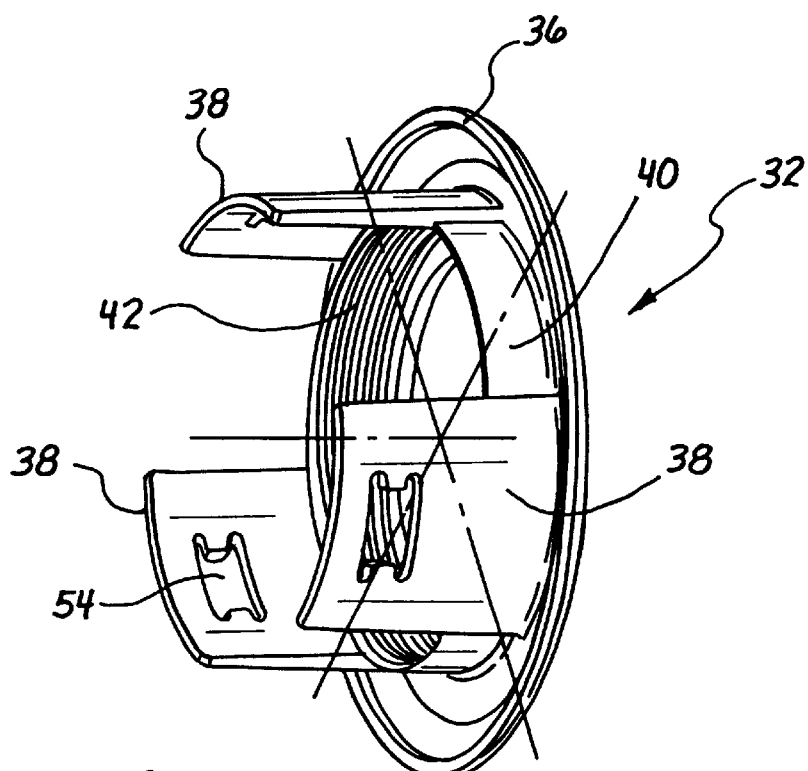
FIG. 7 is a perspective view of another piece of the two-piece housing comprising the inventive optical fiber light fixture.

FIGS. 3–7 show more particular details of the light emitting housing 22 according to the invention. An important feature of the invention is that the housing 22 is comprised of two portions, a first portion 32 (FIG. 7) and a second portion 34 (FIG. 6). The first housing portion 32 comprises a bezel 36 (FIGS. 3, 4, and 7), three spring retaining tangs 38 (FIGS. 3, 5, and 7), and an annular mounting flange 40, having internal threads 42 (FIG. 7). The first housing portion 32 functions as a threadedly engaging lower element that is positioned to be placed in a flush position against a flat surface such as a hollow ceiling. The second housing portion 34 includes the side-mounted optical fiber fitting 27 and the angled reflector surface 24, and further comprises external threads 44 for threadedly engaging the interior threads 42 of the first housing portion, for engagement of the two housing portions. Because of the two-piece design of the housing, various optical accessories 46 (FIG. 5), such as different lenses, diffusers, color filters, shutters, and decorative trim, for example, may be installed in the light fixture, to be accommodated and held by the bezel 36. Retaining springs 48 (FIGS. 3 and 5) are utilized to prevent the light emitting housing 22 from falling out of the plenum in a hollow (suspended) ceiling. Ridges 50 (FIGS. 3, 4, and 6) function to accommodate a coiled spring element 52 which provides bias to the retaining spring 48. Preferably, the retaining springs 48 and coiled spring elements 52 are attached to the first housing portion 32 via spring mounting apertures 54 in the spring retaining tangs 38.

Yet another advantageous feature of the invention is an ability to accommodate optical fibers of various diameters, by installing proper "size reduction" gaskets at the fiber optic insertion point in inlet aperture 26 of the threaded inlet fitting 27. Additionally, the installation of suitable gaskets in the inlet aperture 26 and the exit aperture 30, as well as suitable seals at the threaded fitting engaging the two housing portions 32 and 34 will permit the entire fixture 14 to be sealed for use in "clean" or damaging environments.

While this invention has been described with respect to various specific examples and embodiments, it is to be understood that the invention is not limited thereto and that it can be variously practiced within the scope of the following claims.

What is claimed is:

1. A fiber optic illumination system comprising:

a light source;

an optical fiber for transmitting light from said light source;

a light fixture for delivering light from said light source to a desired region, the light fixture being optically connected to said optical fiber, said light fixture having a housing comprising two engageable portions, a inlet port disposed in a sidewall of said housing, an internal reflector for changing the direction of light entering said housing through said inlet port, and an outlet port disposed on one end of said housing for delivering light to said desired region;

a first of said engageable housing portions comprising a bezel and said outlet port, and a second of said engageable housing portions comprises said inlet port and said internal reflector; and said first and second housing portions each comprising threads for mating said portions.

2. The fiber optic illumination system as recited in claim 1, wherein said housing is fabricated of molded plastic.

3. The fiber optic illumination system as recited in claim 1, wherein an optical accessory may be inserted into one of said first and second housing portions prior to mating said housing portions, said optical accessory consisting one of a diffuser, a lens, a color filter, a shutter, or decorative trim.

4. The fiber optic illumination system as recited in claim 1, wherein said housing further comprises a longitudinal axis, said reflector being disposed at an angle of 30–60 degrees with respect to said axis.

5. The fiber optic illumination system as recited in claim 4, wherein said reflector is disposed at an angle of approximately 45 degrees with respect to said axis.

6. A fiber optic illumination system comprising:
   a light source;
   an optical fiber for transmitting light from said light source; and
   a light fixture for delivering light from said light source to a desired region, the light fixture being optically connected to said optical fiber, said light fixture having a housing comprising two engageable portions, a inlet port disposed in a sidewall of said housing, an internal reflector for changing the direction of light entering said housing through said inlet port, and an outlet port disposed on one end of said housing for delivering light to said desired region;
   wherein said first housing portion further comprises a plurality of tangs extending from said bezel.

7. The fiber optic illumination system as recited in claim 6, wherein said tangs accommodate retaining hardware for attaching said housing to a supporting structure.

8. The fiber optic illumination system as recited in claim 7, wherein said supporting structure comprises a ceiling or wall.

9. The fiber optic illumination system as recited in claim 7, wherein said retaining hardware comprises a retaining spring.

10. A light fixture for delivering light from a light source to a desired region to be illuminated, the light fixture comprising:
    a housing comprising two engageable portions and having a sidewall;
    an inlet port disposed in said housing sidewall;
    an internal reflector for changing the direction of light entering said housing through said inlet port;
    an outlet port disposed on one end of said housing for delivering light to said desired region;
    a first of said engageable housing portions comprising a bezel and said outlet port, and a second of said engageable housing portions comprising said inlet port and said internal reflector;
    wherein said first and second housing portions each comprise threads for mating said portions.

11. The light fixture as recited in claim 10, wherein said housing is fabricated of molded plastic.

12. The light fixture as recited in claim 10, wherein an optical accessory may be inserted into one of said first and second housing portions prior to mating said housing portions, said optical accessory comprising one of a diffuser, a lens, a color filter, a shutter, or decorative trim.

13. A light fixture for delivering light from a light source to a desired region to be illuminated, the light fixture comprising:
    a housing comprising two engageable portions and having a sidewall;
    an inlet port disposed in said housing sidewall;
    an internal reflector for changing the direction of light entering said housing through said inlet port;
    an outlet port disposed on one end of said housing for delivering light to said desired region;
    wherein said first housing portion further comprises a plurality of tangs extending from said bezel.

14. The light fixture as recited in claim 13, wherein said tangs accommodate retaining hardware for attaching said housing to a supporting structure.

15. The light fixture as recited in claim 14, wherein said supporting structure comprises a ceiling or wall.

16. The light fixture as recited in claim 14, wherein said retaining hardware comprises a retaining spring.

17. The light fixture as recited in claim 13, wherein said housing further comprises a longitudinal axis, said reflector being disposed at an angle of 30–60 degrees with respect to said axis.

18. The light fixture as recited in claim 17, wherein said reflector is disposed at an angle of approximately 45 degrees with respect to said axis.

* * * * *